US009543581B2

(12) United States Patent
Paulsen et al.

(10) Patent No.: US 9,543,581 B2
(45) Date of Patent: Jan. 10, 2017

(54) ALUMINA DRY-COATED CATHODE MATERIAL PRECURSORS

(75) Inventors: Jens Paulsen, Daejeon (KR); JiHye Kim, Baeksogdong (KR); HeonPyo Hong, BaekSeokDong (KR)

(73) Assignee: Umicore, Brussels (BE)

( * ) Notice: Subject to any disclaimer, the term of this patent is extended or adjusted under 35 U.S.C. 154(b) by 602 days.

(21) Appl. No.: 13/817,324

(22) PCT Filed: Aug. 4, 2011

(86) PCT No.: PCT/EP2011/063412
§ 371 (c)(1),
(2), (4) Date: Mar. 21, 2013

(87) PCT Pub. No.: WO2012/022618
PCT Pub. Date: Feb. 23, 2012

(65) Prior Publication Data
US 2013/0209885 A1    Aug. 15, 2013

Related U.S. Application Data

(60) Provisional application No. 61/344,554, filed on Aug. 20, 2010.

(30) Foreign Application Priority Data

Aug. 17, 2010    (EP) .................................. 10008556

(51) Int. Cl.
*H01M 4/485*    (2010.01)
*H01M 4/505*    (2010.01)
(Continued)

(52) U.S. Cl.
CPC .............. *H01M 4/525* (2013.01); *B82Y 30/00* (2013.01); *C01G 51/04* (2013.01); *C01G 53/04* (2013.01);
(Continued)

(58) Field of Classification Search
CPC ..................................................... H01M 4/525
(Continued)

(56) References Cited

U.S. PATENT DOCUMENTS

| 2006/0089257 A1 | 4/2006 | Albrecht et al. |
| 2009/0050859 A1 | 2/2009 | Liu et al. |
| 2011/0049420 A1* | 3/2011 | Ellenwood et al. ....... 252/182.1 |

FOREIGN PATENT DOCUMENTS

| EP | 1637503 | 3/2006 |
| EP | 2104163 | 9/2009 |

(Continued)

OTHER PUBLICATIONS

Huang, Youyuan, Jitao Chen, Fuquan Cheng, Wang Wan, Wen Liu, Henghui Zhou, and Xinxiang Zhang. "A Modified Al2O3 Coating Process to Enhance the Electrochemical Performance of Li(Ni1/3Co1/3Mn1/3)O2 and Its Comparison with Traditional Al2O3 Coating Process." Journal of Power Sources 195.24 (2010): 8267-274.*

(Continued)

*Primary Examiner* — James Lee
(74) *Attorney, Agent, or Firm* — Brinks Gilson & Lione (57) ABSTRACT

A particulate precursor compound for manufacturing an aluminum doped lithium transition metal (M)-oxide powder usable as an active positive electrode material in lithium-ion batteries includes a transition metal (M)-hydroxide or (M)-oxyhydroxide core and a non-amorphous aluminum oxide coating layer covering the core. By providing an aluminum dry-coating process where the particulate precursor core compound is mixed with alumina powder in one or more procedures, higher doping levels of aluminum compared to the known prior art may be achieved. The crystal structure of the alumina is maintained during the coating procedures and the core of each mixed transition metal precursor particle is surrounded by a coating layer containing crystalline alumina nano particles. The aluminum concentration in
(Continued)

the particulate precursor decreases as the size of the core increases.

9 Claims, 8 Drawing Sheets (51) Int. Cl.
  *H01M 4/525*   (2010.01)
  *B82Y 30/00*   (2011.01)
  *C01G 51/04*   (2006.01)
  *C01G 53/04*   (2006.01)
  *C04B 35/01*   (2006.01)
  *C04B 35/628*   (2006.01)

(52) U.S. Cl.
  CPC ......... *C04B 35/01* (2013.01); *C04B 35/62813* (2013.01); *C04B 35/62892* (2013.01); *H01M 4/485* (2013.01); *H01M 4/505* (2013.01); *C01P 2002/52* (2013.01); *C01P 2002/72* (2013.01); *C01P 2004/03* (2013.01); *C01P 2004/84* (2013.01); *C04B 2235/3262* (2013.01); *C04B 2235/3275* (2013.01); *C04B 2235/3279* (2013.01); *C04B 2235/44* (2013.01); *C04B 2235/5454* (2013.01); *Y02E 60/122* (2013.01); *Y02P 70/54* (2015.11)

(58) Field of Classification Search
  USPC ..................... 429/223; 427/126.4; 423/600
  See application file for complete search history.

(56) References Cited

FOREIGN PATENT DOCUMENTS

| JP | 2001106534 | 4/2001 |
|---|---|---|
| WO | WO 2006033525 | 3/2006 |
| WO | WO 2009074311 | 6/2009 |

OTHER PUBLICATIONS

Cho et al., "Significant Improvement of $LiNi_{0.8}Co_{0.15}Al_{0.05}O_2$ Cathodes at 60° C. by $SiO_2$ Dry Coating for Li-Ion Batteries," Journal of the Electrochemical Society, vol. 157, No. 6, (2010), pp. A625-A629.

Cho et al., "High Performance $LiCoO_2$ Cathode Materials at 60° C. for Lithium Secondary Batteries Prepared by the Facile Nanoscale Dry-Coating Method," Journal of the Electrochemical Society, vol. 157, No. 5, (2010), pp. A617-.

Pfeffer et al., "Synthesis of Engineered Particulates with Tailored Properties using Dry Particle Coating," Powder Technology, vol. 117, (Jan. 1, 2001), pp. 40-67.

International Search Report, issued in PCT/EP2011/063412, dated Oct. 7, 2011.

International Preliminary Report on Patentability, issued in PCT/EP2011/063412, dated Sep. 18, 2012.

* cited by examiner

ALUMINA DRY-COATED CATHODE MATERIAL PRECURSORS

This application is a National Stage application of International Application No. PCT/EP2011/063412, filed Aug. 4, 2011, which claims the benefit of U.S. Provisional Application No. 61/344,554, filed Aug. 20, 2010. This application also claims priority under 35 U.S.C. §119 to European Patent Application No. 10008556.2, filed Aug. 17, 2010.

TECHNICAL FIELD OF THE INVENTION

The present invention relates to precursor compounds for cathode materials used in rechargeable lithium batteries and, more particularly, to particulate transition metal hydroxide $M(OH)_2$ or metal oxyhydroxide MOOH precursor compounds.

BACKGROUND OF THE INVENTION

Rechargeable lithium and lithium-ion batteries are, due to their high energy density, widely used as power sources for portable electronic devices such as cellular phones, laptop computers, digital cameras or video cameras. Commercially available lithium-ion batteries typically consist of a graphite-based anode and an active cathode where lithium ions can reversibly be embedded and released.

Previously, $LiCoO_2$ was the most used cathode material. However, $LiCoO_2$-based cathode materials are expensive and typically have a relatively low capacity of about 150 mAh/g. Therefore, a substitution of $LiCoO_2$ by materials such as lithium nickel oxide based cathodes (LNO), such as $LiNi_{0.8}Co_{0.2}O_2$, nickel rich lithium nickel manganese cobalt oxides (LNMO), such as $LiNi_{0.5}Mn_{0.3}Co_{0.2}O_2$, or lithium nickel manganese cobalt oxides (LMNCO), such as $LiNi_{0.33}Mn_{0.33}Co_{0.33}O_2$, is in progress. However, an important concern with these layered oxides is their thermal instability in organic electrolytes. If the battery is charged, potentially, the delithiated cathode reacts with the electrolyte, creating heat which speeds up the reaction which ultimately might cause "thermal runaway" meaning the cell explodes. Doping of the cathode, if it lowers the reactivity of the cathode with electrolyte, can help to improve the safety of the cells.

It is commonly known that aluminum can be doped into these cathode materials. It is also widely accepted that aluminum doping improves the safety properties of these materials. For example, whereas $LiNi_{0.8}Co_{0.2}O_2$ is practically not applied due to a relatively high thermal instability, a related aluminum doped material (NCA) $LiNi_{0.8}Co_{0.15}Al_{0.05}O_2$, is commercially available. Generally, if aluminum is doped into a layered cathode material with a layer structure, the reversible capacity decreases by 1-2 mAh per mol % of aluminum. Thus, $LiNi_{0.8}Co_{0.2}O_2$ has about 200 mAh/g reversible capacity at 4.3-3.0 V but 5% Al doped material (NCA) has about 190-194 mAh/g. This decrease in capacity, however, may be acceptable if the gain in improved safety is relatively significant.

Moreover, for applications where the energy density might be less important, for example for large size batteries like HEV or EV batteries, Li—Mn—O spinel and $LiFePo_4$ based cathode materials are currently considered based on their better safety performance, despite their much lower energy density than above mentioned LNO, LNMO, and LMNCO materials.

Research has indicated that the solid solution "solubility" of aluminum in LNMCO cathode materials is relatively high, that the thermal instability decreases and therefore the safety increases relatively fast with an increasing aluminum doping level, and that relatively significant amounts of aluminum can be doped into LMNCO cathode materials while retaining a higher volumetric energy density than Li—Mn—O spinel or $LiFePo_4$ based cathode materials. Considering these facts, it is obvious that aluminum doping with relatively high concentrations, for example >5 mol % Al/(Al+transition metal) may be a promising approach to achieve cathodes with superior performance compared to Li—Mn—O spinel and $LiFePo_4$ based cathode materials.

A major problem, however, is that doping with aluminum is not a simple process. At production scale LNMCO cathodes are typically prepared from mixed metal precursors such as mixed transition metal hydroxide $M(OH)_2$ or oxyhydroxide MOOH. The precursors are typically obtained by a precipitation of a base and acid solution, for example, $2NaOH+MSO_4 \rightarrow M(OH)_2+Na_2SO_4$, possibly in the presence of a chelating agent like $NH_4OH$. The precursor is then usually mixed with a lithium source (for example, $Li_2CO_3$) followed by a simple solid state reaction.

While it is possible to dope aluminum into the precursor, the problem exists that aluminum does not fit easily into the $M(OH)_2$ structure since the transition metal is divalent while aluminum is trivalent. As a result, instead of an $M(OH)_2$ structure more complex structures such as layered double hydroxides, containing anionic impurities and crystal water, are obtained. It is further much more difficult to obtain a good morphology. For example, under conditions (such as temperature, pH, and so on) where $M(OH)_2$ would precipitate with a good morphology, $Al(OH)_3$ might be soluble causing a relatively poor morphology. Typical for co-precipitation with aluminum is a relatively low density, high anionic impurity levels and the obtained powder consists usually of unstructured fluffy agglomerates instead of nicely developed particles.

An alternative known approach is the coating with aluminum through a separate precipitation following the precipitation of the $M(OH)_2$ structure. Under ideal conditions an $Al(OH)_3$ layer will coat the $M(OH)_2$ core. Such approach is described in EP1637503A1 and JP2001-106534 where a lithium-nickel based cathode precursor is coated by an amorphous layer of aluminum hydroxide in a wet aluminum coating process. Wet aluminum coating is a relatively difficult process that often results in a relatively poor morphology since a sufficient density of the $Al(OH)_3$ film might not be achieved. The existing impurity problem as described above may not be solved and it may be very difficult to achieve high doping levels of aluminum (>5 mol %) through wet aluminum coating due to the formation of relatively thick coating layers.

Furthermore, wet aluminum coating is a relatively expensive process. In JP2001-106534 it is suggested that an aluminum oxide coating can be deposited on the surface of nickel hydroxide particles, however the only method disclosed is a wet precipitation process using an aluminum nitrate aqueous solution to deposit an aluminum hydroxide coating.

Coating of cathodes or cathode precursors has been described in the previous art. Dry coating by nanoparticles as fumed silica, fumed alumina, fumed zirconium, etc has been disclosed, but to our knowledge disclosures are limited to very small coating levels, typically not exceeding 1% by weight.

What is needed in the art is a coating process that enables the formation of particulate mixed transition metal hydroxide M(OH)$_2$ or oxyhydroxide MOOH precursors doped with aluminum that have an improved morphology compared to the known prior art.

It is a principal object of the present invention to provide novel precursors that enable the preparation of higher quality aluminum doped cathode materials, such as LNMCO or NCA cathode materials, at lower cost compared to currently available precursors.

SUMMARY OF THE INVENTION

Briefly described, the present invention addresses the shortcomings of prior art precursors suitable for preparation of cathode materials for rechargeable lithium and lithium-ion batteries by providing particulate mixed transition metal hydroxide M(OH)$_2$ or oxyhydroxide MOOH precursor core materials that have been coated with aluminum during a dry-coating process. The powdered core particles of the precursors of the present invention include for example a core of nickel/manganese/cobalt oxyhydroxide or nickel/cobalt hydroxide and a surface that is coated with crystalline alumina (Al$_2$O$_3$) nanoparticles.

The coated particles of the precursor in accordance with the present invention show a size dependent composition where the relative aluminum content decreases with increasing particle size. This is desirable to achieve good safety, which is because smaller particles contribute more to the surface of the powder. The reactions between electrolyte and cathode take place on the surface. On the other hand, if Al causes a deterioration of electrochemical performance (particularly of the Li diffusion) then the effect is less in the case of small particles. Thus it is beneficial if the Al concentration increase with decreasing particle size.

The present invention further provides an aluminum dry-coating process that enables the formation of precursors with higher doping levels of aluminum than currently possible with known prior wet aluminum coating processes. This can be reached by mixing particulate transition metal hydroxide M(OH)$_2$ or oxyhydroxide MOOH precursor core materials with alumina in one or more coating procedures. The alumina can be obtained by precipitation, spray drying, milling, etc. In one embodiment the alumina typically has a BET of at least 50 m$^2$/g and consists of primary particles having a d50 <100 nm, the primary particles being non-aggregated. In another embodiment fumed alumina or surface treated fumed alumina is used. The crystalline structure of the fumed alumina is maintained during the coating procedures and is, therefore, found in the coating layer surrounding the M(OH)$_2$ or MOOH core. Fumed alumina nanoparticles are produced in high temperature hydrogen-air flames and are used in several applications that involve products of every day use.

BRIEF DESCRIPTION OF THE DRAWINGS

The present invention will now be described, by way of example, with reference to the accompanying drawings, in which.

The exemplification set out herein illustrates preferred embodiments of the invention, in one form, and such exemplification is not to be construed as limiting the scope of the invention in any manner.

DETAILED DESCRIPTION OF THE INVENTION

In one embodiment of the present invention an aluminum dry-coating process is provided that enables achievement of higher doping levels (than in the prior art) of aluminum in particulate transition metal hydroxide M(OH)$_2$ or oxyhydroxide MOOH precursor compounds, which may have a general formula (M-hydroxide)$_a$.(Al$_2$O$_3$)$_b$ or (M-oxyhydroxide)$_a$.(Al$_2$O$_3$)$_b$ with a+(2*b)=1. In one embodiment b≤0.4. The transition metal (M)-hydroxide or (M)oxyhydroxide may be obtained by coprecipitation of the sulfates of the elements constituting the transition metal M in the presence of an alkali hydroxide.

For example, a nickel/manganese/cobalt precursor core compound with the composition MOOH (M=Ni$_x$Mn$_y$Co$_z$ with 0.3≤x≤0.9; 0≤y≤0.45 and 0<z≤0.4 and x+y+z=1) or a nickel/cobalt precursor core compound with the composition M(OH)$_2$ may be dry-coated with aluminum oxide (alumina) by filling a mixer, such as a 2 L Henschel type high speed mixer (Jacketed bowl, blade speed range 750-3000 rpm, 0.75 hp motor; from Reimelt Henschel GmbH, Germany), with a volume consisting of the particulate precursor core compound and alumina (Al$_2$O$_3$) powder (see also Example 1 and Example 2). The mixer is then rotated at a constant speed, for example 1000 rpm, for a time period of, for example, 30 min. During this mixing time, the alumina particles slowly fade out of sight coating the MOOH powder particles, and the volume in the mixer decreases. The mixing time may be chosen such that no traces visible to the naked eye of the alumina remain in the end. At that time also the volume does not decrease anymore during mixing.

The quantity of the particulate precursor and the alumina may be chosen, for example, such that a doping level of 5 mol % alumina is achieved during one coating procedure. Thus, 5 mol % of alumina may be added per 1 mol mixed transition metal precursor. While this ratio of quantities was found to be working well other ratios may also be used. To achieve higher doping levels of aluminum, the described coating procedure may be repeated several times. A doping level of aluminum of 10 mol % may, therefore, be achieved by performing a first coating procedure with 5 mol % of alumina followed by a second coating procedure with 5 mol % of alumina. Consequently, a doping level of alumina of 15 mol % may be achieved by performing three consecutive coating procedures utilizing 5 mol % of alumina each time.

While the volume of the alumina exceeds the volume of the mixed metal hydroxide or oxyhydroxide precursor by far—surprisingly—the coated precursor has about the same volume as the original mixed metal hydroxide or oxyhydroxide precursor. Its volume increases by some 5 to 15% according to the required doping level of alumina. The MOOH or $M(OH)_2$ powder does not change the color much during the coating procedures. Consequently, the alumina may cover the particles of the precursor with a thin, transparent, relatively dense film.

The embodiments of the aluminum dry-coating process are further described in the following examples:

EXAMPLE 1

1 kg of a Ni—Mn—Co precursor with composition MOOH, $M=Ni_{0.46}Mn_{0.39}Co_{0.15}$ is filled into a mixer (for example a 2 L Henschel type Mixer) and 25.5 g of fumed alumina ($Al_2O_3$) nano-powder is added. During mixing for 30 min at 1000 rpm the fumed alumina slowly fades out of sight and a coated MOOH powder, looking very much like the initial powder (black color, small volume) results. With this ratio of quantities precursor/fumed alumina a doping level of aluminum of 5 mol % is achieved.

Then another 25.5 g of fumed alumina is added, and the mixing is continued for 30 min at 1000 rpm, resulting again in a black powder with small volume. No traces, visible to the naked eye, of the fumed alumina remains after the two coating procedures. Obviously, the all or nearly all of the fumed alumina is utilized to cover the precursor particles with a thin, transparent, relatively dense film. By adding this second coating procedure, a doping level of aluminum of 10 mol % is achieved.

Cross-sections of the 10 mol % Aluminum coated MOOH power for analysis by FESEM are prepared by immersing the dry-coated precursor powder into a polymer followed by polishing.

EXAMPLE 2

In this example, performed according to the general outline of Example 1, a Ni—Co compound with composition $M(OH)_2$ ($M=Ni_{0.8}Co_{0.15}$) is coated with nanometric fumed alumina powder. Two sets of coated samples are prepared. The first set of the coated samples has a doping level of aluminum of 5 mol % (5 mol % Al+0.95 mol % M) after performing only one coating procedure. The second set of samples had a doping level of aluminum of 15 mol % after performing three consecutive coating procedures, adding each time 5 mol % of the fumed alumina per 1 mol of the transition metal.

X-ray diffraction patterns reveal that the aluminum coating layer is not amorphous. Thus, the crystal structure of the fumed alumina is maintained during the coating procedures and the core of the $M(OH)_2$ precursor particles is surrounded by a coating layer or shell containing crystalline alumina nano particles.

Figure 1:
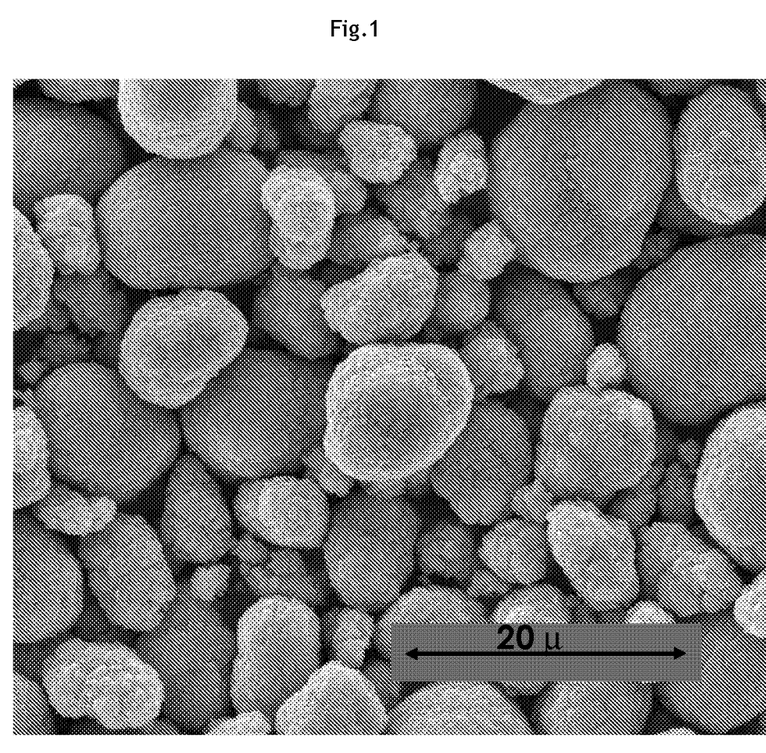
FIG. 1 is a SEM (scanning electron microscope) micrograph of a MOOH precursor before a first aluminum coating procedure, in accordance with one embodiment of the present invention.
Figure 2:
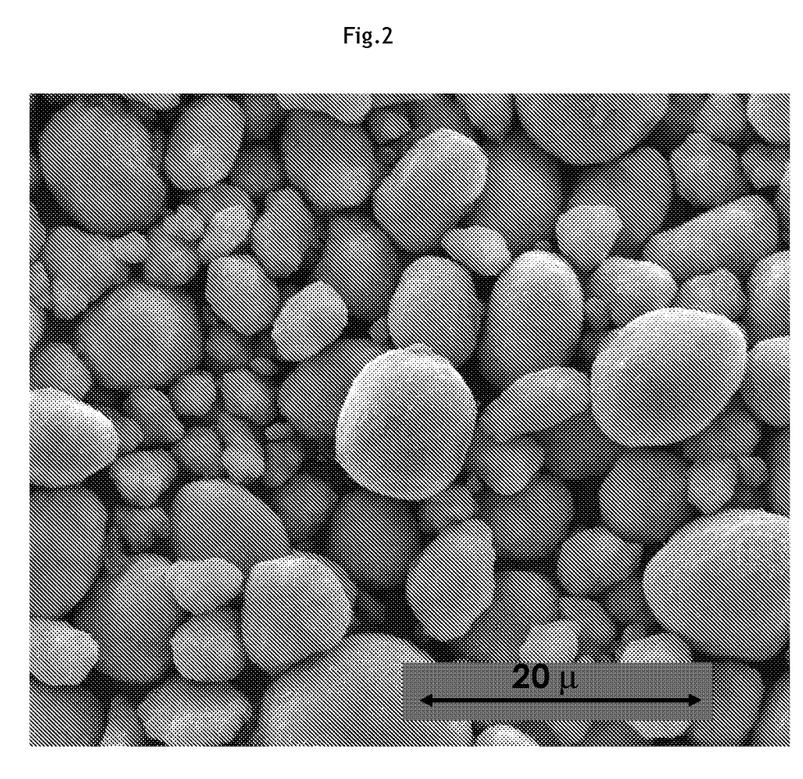
FIG. 2 is a SEM micrograph of the MOOH precursor after a second aluminum coating procedure (10 mol % aluminum), in accordance with one embodiment of the present invention.

Referring to FIGS. 1 and 2, SEM (scanning electron microscope) micrographs of a MOOH precursor before a first aluminum coating procedure and after a second aluminum coating procedure (10 mol % aluminum), respectively, are illustrated according to one embodiment of the present invention and in accordance with the description in Example 1. As can be seen the aluminum coating layers covering the precursor powder particles has high density, is continuous and is smooth. Its thickness varies between 0.1 and 1.5 µm.

Figure 3:
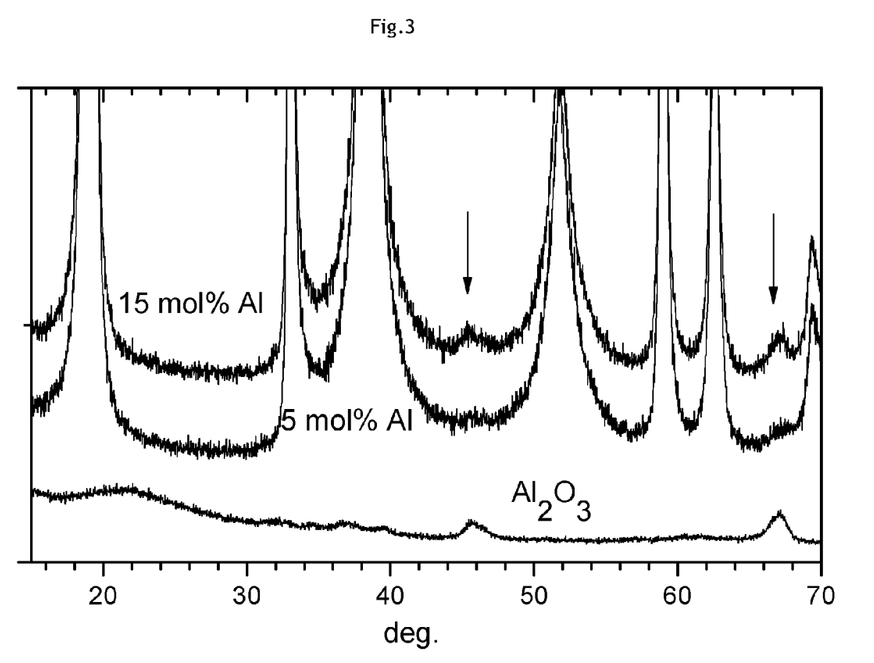
FIG. 3 is a X-ray diffraction pattern of a M(OH)$_2$ precursor after a first and a third aluminum coating procedure (5 mol % and 15 mol % aluminum, respectively), in accordance with one embodiment of the present invention.

Referring now to FIG. 3, an exemplary X-ray diffraction pattern of a $M(OH)_2$ precursor after a first and a third aluminum coating procedure (5 mol % (bottom) and 15 mol % (top) aluminum, respectively) is illustrated according to one embodiment of the present invention and in accordance with the description in Example 2. The pattern of alumina is added for reference as bottom line. As can be seen, the surface coating is not amorphous. This becomes apparent for the sample coated with 5 mol % aluminum and is clearly noticeable for the sample coated with 15 mol % aluminum (notice the two arrows pointing at peaks corresponding to the alumina pattern). Thus, the crystal structure of the fumed alumina is maintained during the first and also the second coating procedure and the core of each mixed transition metal precursor core particle is covered by a non-amorphous coating layer containing crystalline alumina nanoparticles and, therefore, has a crystalline structure.

Figure 4:
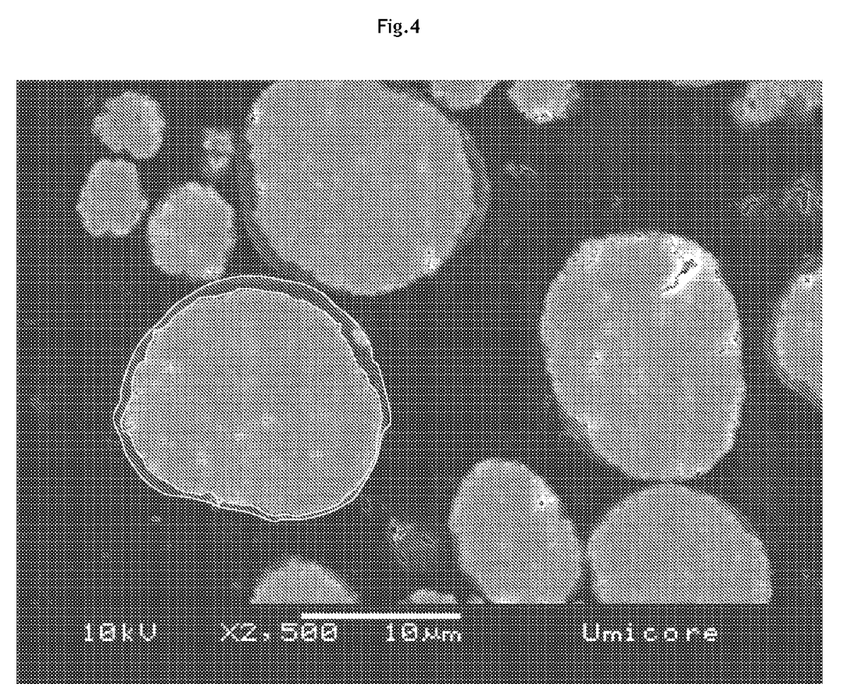
FIG. 4 is a FESEM (field emission scanning electron microscope) micrograph of a polished cross-section of the MOOH precursor after the second aluminum coating procedure (10 mol % aluminum), in accordance with one embodiment of the present invention.

In FIG. 4, a FESEM (field emission scanning electron microscope) micrograph of a polished cross-section of the MOOH precursor after the second aluminum coating procedure (10 mol % aluminum) is shown illustrated according to one embodiment of the present invention and in accordance with the description in Example 1. The micrograph of FIG. 4 is representative for typical results obtained using the dry-coating process of the present invention. As a guide for the eye, two lines were added that assist in illustrating that the coating layer is complete covering the entire outer surface of each of the precursor core particles. As can be seen, the coating layer is relatively dense, thus, having a relatively low porosity.

Figure 5:
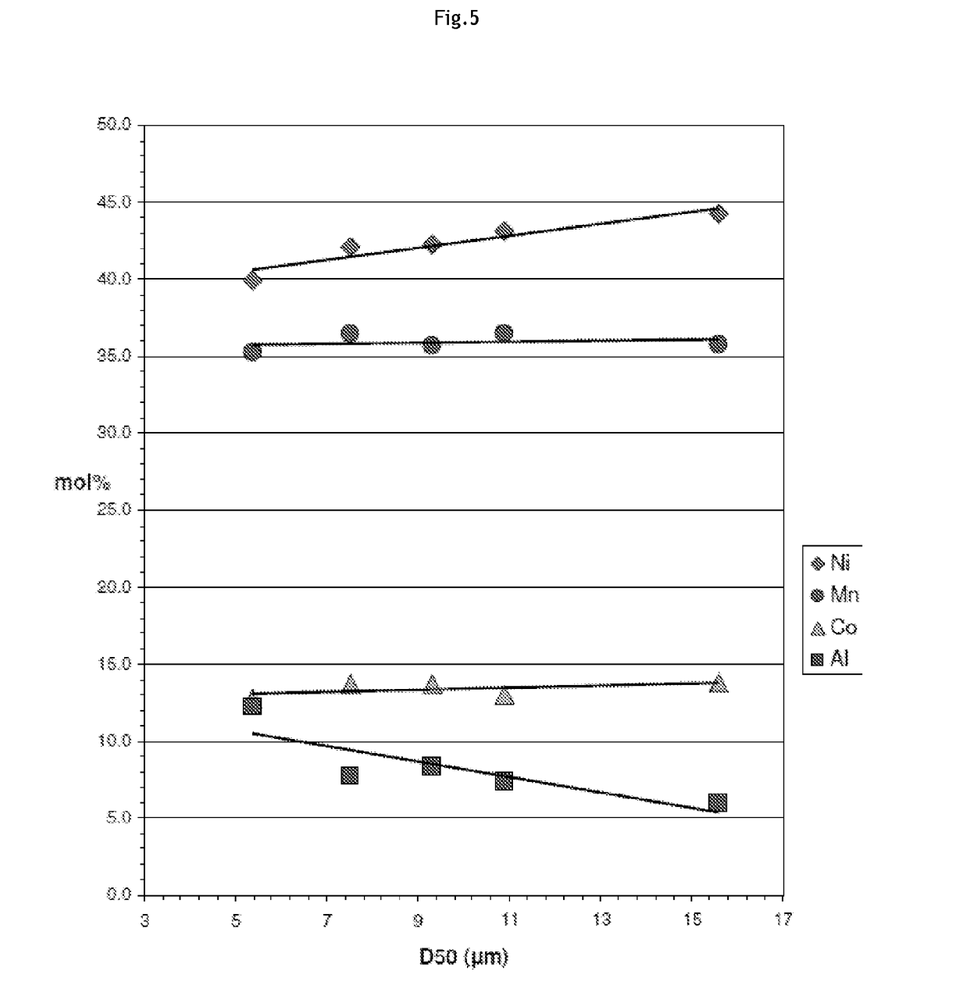
FIG. 5 is a diagram illustrating the metal stoichiometry obtained by ICP-MS (inductively coupled plasma mass spectrometry) from different size fractions of the MOOH precursor after the second aluminum coating procedure (10 mol % aluminum), in accordance with one embodiment of the present invention.

The coating layer may in average not depend on the size of the precursor particles. If the thickness of the coating layer does not change with particle size (as indicated in FIG. 4) then a composition dependency may be expected since larger particles typically have a lower aluminum stoichiometry. Such a composition dependency, where smaller particles have higher aluminum content than larger particles, is in the case of aluminum doped precursors desirable since especially the smaller precursor particles pose a safety concern due to their relatively low thermal stability and since aluminum increases the thermal stability of the precursor in organic electrolytes. To confirm this, the precursor powder was separated into different size fractions by a fractionation experiment and examined by laser diffraction. In such fractionation experiment, a slow laminar flow of the aluminum covered precursor powder immersed in water was used to separate different size fractions. As can be seen in FIG. 5, a size dependent composition of the aluminum was confirmed by ICP-MS (inductively coupled plasma mass spectrometry) analysis from different size fractions of the MOOH precursor after the second aluminum coating procedure (10 mol % aluminum) according to one embodiment of the present invention and in accordance with the description in Example 1 and the data displayed in Table 1. Smaller particles have a much higher aluminum concentration than larger particles. The aluminum concentration decreases from about 12 mol % to about 6 mol % as the size (D50 of the PSD) of the coated precursor particles increases from about 5 µm to about 16 µm (see also Table 1).

TABLE 1

Composition (IPC) of the different sized fractions as function of D50 (median) particle size

| Sample | size (µm) | | | mol % | | | |
|---|---|---|---|---|---|---|---|
| | D10 | D50 | D90 | Ni | Mn | Co | Al |
| Non-fractionated | 5.03 | 9.30 | 16.51 | 42.3 | 35.7 | 13.7 | 8.3 |
| Fraction 1 | 3.38 | 5.39 | 8.90 | 39.9 | 35.2 | 12.8 | 12.2 |
| Fraction 3 | 5.40 | 7.52 | 10.51 | 42.1 | 36.5 | 13.7 | 7.7 |
| Fraction 5 | 7.90 | 10.89 | 15.00 | 43.1 | 36.5 | 13.0 | 7.4 |
| Fraction 7 | 11.16 | 15.58 | 21.73 | 44.3 | 35.8 | 13.8 | 6.0 |

Figure 6:
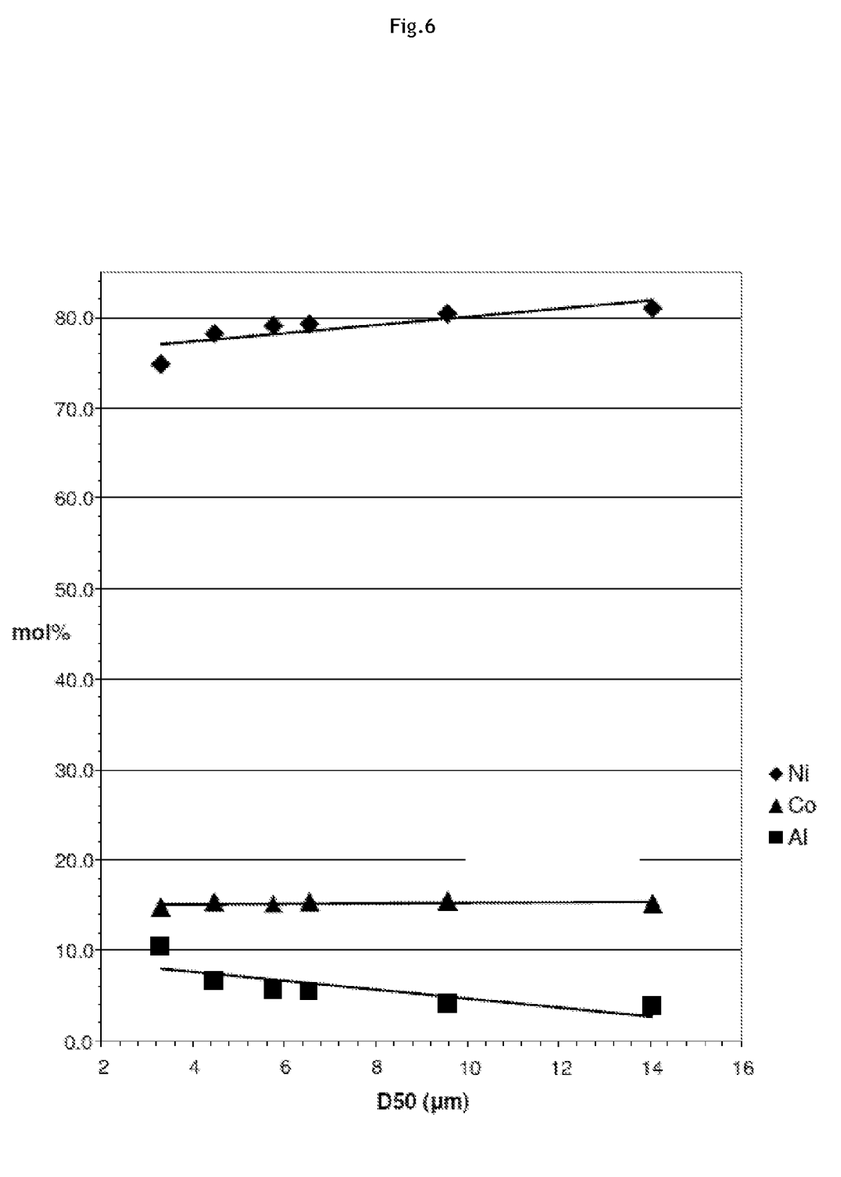
FIG. 6 is a diagram illustrating the metal stoichiometry obtained by ICP-MS from different size fractions of a M(OH)$_2$ precursor after a first aluminum coating procedure (5 mol % aluminum), in accordance with one embodiment of the present invention.

Referring now to FIG. 6, a diagram illustrating the metal stoichiometry obtained by ICP-MS from different size fractions of a $M(OH)_2$ precursor after a first aluminum coating procedure (5 mol % aluminum) is illustrated according to one embodiment of the present invention and in accordance with the description in Example 2. The data were obtained by ICP analysis of size fractionized samples similar as described with FIG. 5. As can be seen, the aluminum content decreases with increasing size of the coated precursor particles.

Furthermore, for the preparation of cathode materials from aluminum precursors it may be advantageous that the aluminum is present in form of a coating layer, for example, as achieved by the aluminum dry-coating process in accordance with one embodiment of the present invention. As a counter example, if more than a few weight % of alumina is used, and the alumina is not present as a coating layer but present as separate particles in a mixture, then not all alumina is in contact with the active material and after sintering a powder, being a mixture of insufficiently coated active material and remaining alumina is achieved. Thus, a simple solid state reaction, such as heating a blend of an aluminum precursor, a transition metal precursor and a lithium salt may not lead to a well doped final lithiated product without applying excessive sintering, because $Al_2O_3$ (corundum), which is a highly inert phase, forms at relatively low temperatures. The corundum is relatively slow to react with the lithium transition metal oxide and, thus, only if excessive high temperatures or excessive long sintering is applied, may a well doped cathode material be achieved. However, such lithiated materials are typically oversintered, which is indicated by relatively large crystallite size that typically causes poor performance. The larger the alumina content, the more pronounced this problem is. Experiments show that if the $Al_2O_3$ is in good contact with the precursor particle in form of a coating layer, which can be obtained, for example, with the above described aluminum dry-coating process in accordance with one embodiment of the present invention, an aluminum coated lithium transitional metal with relatively high Al doping level and high crystallinity may be obtained at relatively low temperatures—as will be illustrated below.

Figure 7:
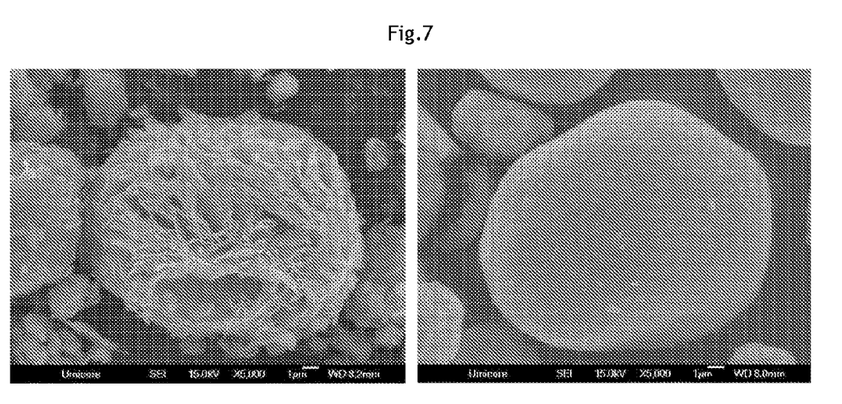
FIG. 7 is a SEM micrograph of an Al-containing NMC precursor made via coprecipitation with Al (left-side image) and an Al-containing NMC precursor made via the Al-dry-coating process (right-side image).

As can be seen, the present invention provides particulate mixed transition metal hydroxide $M(OH)_2$ or oxyhydroxide MOOH precursors that have been coated with aluminum during a dry-coating process. The obtained aluminum dry-coated precursors are, for example, suitable for preparation of cathode materials for rechargeable lithium and lithium-ion batteries. By providing an aluminum dry-coating process, higher doping levels of aluminum compared to the known prior art may be achieved. The crystal structure of the fumed alumina may be maintained during the coating procedures and the core of each mixed transition metal precursor particle may be surrounded by a coating layer containing crystalline alumina nanoparticles. Furthermore, the characteristics, such as density, anionic impurities and morphology, of the aluminum dry-coated precursor in accordance with the present invention are improved as compared to known prior art precursors, such as those made via coprecipitation with Aluminum (see Table 2 and FIG. 7).

TABLE 2

Advantage of using the Al-dry coating process as compared to the classical method based on coprecipitation with Al.

| Sample | Tap density (g/cm3) | SO4 impurity (wt %) | Morphology |
|---|---|---|---|
| Al-coprecipitated | 0.57 | 2.46 | See SEM |
| Al-dry-coated | 2.24 | 0.45 | image (FIG. 7) |

EXAMPLE 3

The MOOH precursor ($M=Ni_{0.46}Mn_{0.39}Co_{0.15}$) of Example 1 is used as primary core compound. The alumina dry coating as described in Example 1 is applied to this compound. As a result of the coating secondary precursors are prepared. The total aluminum content ranges from 0, 1.5, 3, 5 and 10 mol %, respectively for 1 mol Ni—Mn—Co.

For each of the secondary precursors the blend ratio and firing temperature is optimized. As optimized conditions T=990° C. and a lithium to metal (Li:M, M=Ni+Mn+Co+Al) stoichiometric blend ratio Li:M=1.088 is chosen.

Testing focuses on electrochemical performance and structure:

a) Electrochemical performance:

The capacity decreases continuously with Al doping level.

The first charge capacity decreases by 0.5% per 1 mol % Aluminum doping.

The reversible capacity decreases by about 1% per 1 mol % Al doping.

Rate performance decreases modestly from about 88 to 85% (capacity at 2 C relative to capacity at 0.1 C).

Cycle stability at 4.5V or even at 4.6V does not change.

Figure 8:
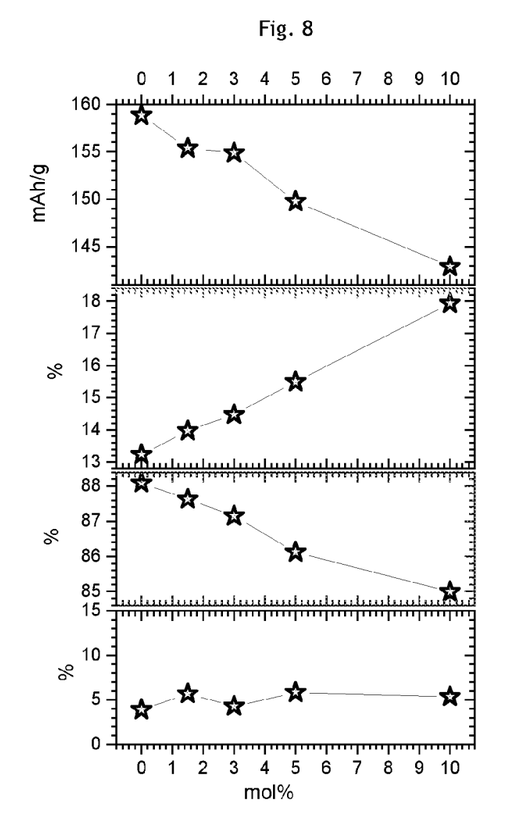
FIG. 8: Evolution of electrochemical performance as function of Al doping level.

FIG. 8 illustrates the evolution of the electrochemical performances as a function of the Al doping level (mol %). From top to bottom the following characteristics are shown:

Reversible capacity

Q irrev: irreversible capacity at first discharge—in %

Rate capability: capacity at 2 C vs. 0.1 C—in %

Fading rate: loss of capacity between cycle 2 and cycle 100—in %.

b) Structure:

The structure is observed by X-ray analysis (Rietveld refinement). All materials are single layered phase, and no Al impurities are visible. The unit cell volume decreases continuously—see Table 3. However, the crystallinity is similar and does not depend on the Al doping level. The surface area is unchanged as well and is between 0.295 to 0.31 m²/g. By SEM no influence on Al doping on crystallite size, particle shape or phase purity is detectable. Also the content of soluble base does not change with Al doping level.

TABLE 3

Structural data as a function of Al doping level (LMNCO material)

| Al (mol %) | Unit cell volume ($A^3$) | X-ray crystallite size (nm) |
|---|---|---|
| 0 | 33.90794 | 146 |
| 1.5 | 33.87749 | 140 |
| 3 | 33.86687 | 149 |
| 5 | 33.80924 | 150 |
| 10 | 33.77936 | 151 |

EXAMPLE 4

In Example 3, for a series of samples with increasing aluminum content, it is shown that all final samples are single phase and the crystallinity increases slightly with increasing aluminum doping level. This proves that single phase high crystalline final samples can be obtained from Al dry coated precursors.

However, in this example a high sinter temperature (990° C.) is used. The following example illustrates that even at low sintering temperature well crystallized single phase samples can be obtained from Al dry-coated precursors. The initial precursor core is $M(OH)_2$ with $M=Ni_{0.8}Co_{0.2}$ which is dry coated by $Al_2O_3$ resulting in 0, 3, 5, 10, 15, 20 mol % Al per 1 mol of Ni+Co. After alumina coating the samples are mixed with $LiOH*H_2O$ and heated in a flow of oxygen for 12 h at 750° C.

Figure 9:
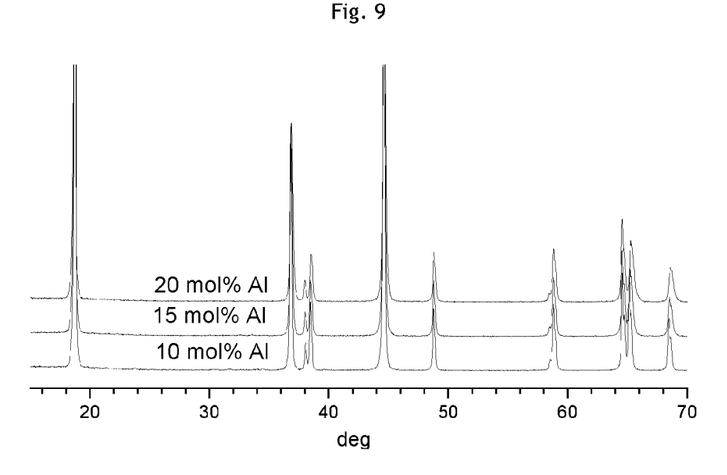
FIG. 9: X-ray diffraction pattern of LiMO$_2$ doped with 10, 15, 20 mol % Al doping prepared from Al$_2$O$_3$ dry-coated precursor. About 50% of the height of the 003 peak at 18 deg. is shown.

FIG. 9 illustrates the X-ray diffraction pattern of the samples with 10, 15 and 20 mol % Al (basis: scattering angle). All pattern are single phase and have narrow peaks indicating high crystallinity. Table 4 lists the unit cell volume and the crystallite size obtained from a Rietveld refinement of the measured pattern. The large change of lattice constant, together with the absence of impurity phase, confirms that Al is doped into the crystal structure without causing significant decrease of crystallinity. Obviously, even at the low temperature of 750° C. large amounts of aluminum can be doped into battery cathode materials by using dry coated precursors according the present invention.

TABLE 4

Structural data as a function of Al doping level (LNO material)

| Al (mol %) | Unit cell volume ($A^3$) | X-ray crystallite size (nm) |
|---|---|---|
| 10 | 33.5133 | 146 |
| 15 | 33.4580 | 130 |
| 20 | 33.3712 | 130 |

The invention can alternatively be described by the following clauses:

1. A particulate precursor compound for manufacturing an aluminum doped lithium transition metal (M)-oxide powder usable as an active positive electrode material in lithium-ion batteries, each particle of the precursor compound comprising:
   a transition metal (M)-hydroxide or (M)-oxyhydroxide core; and
   a non-amorphous aluminum oxide $Al_2O_3$ coating layer covering the core.

2. The precursor compound of clause 1, wherein the precursor compound has a general formula $(M\text{-hydroxide})_a \cdot (Al_2O_3)_b$ or $(M\text{-oxyhydroxide})_a \cdot (Al_2O_3)_b$, wherein $a+(2*b)=1$.

3. The precursor compound of clause 2, wherein $b \leq 0.4$.

4. The precursor compound of clause 1, characterized in that the transition metal (M) is $Ni_xMn_yCo_z$, wherein $0.3 \leq x \leq 0.9$; $0 \leq y \leq 0.45$ and $0 \leq z \leq 0.4$ with $x+y+z=1$.

5. The precursor compound of clause 1, wherein the coating layer contains crystalline alumina nanoparticles.

6. The precursor compound of clause 1, wherein the coating layer covers the entire outer surface of each of the precursor particles.

7. The precursor compound of clause 1, having an aluminum doping level of 3 mol % or higher.

8. The precursor compound of clause 1, wherein the aluminum concentration in the precursor compound decreases as the size of the core increases.

9. The precursor compound of clause 1, wherein the transition metal (M)-hydroxide or (M)-oxyhydroxide core is mixed with nanometric non-agglomerated alumina powder in one or more procedures to dry-coat the core with the coating layer.

10. The precursor compound of clause 2, having the composition $[Ni_{0.821}Co_{0.154}(OH)_2]_{0.975+c} \cdot [Al_2O_3]_{0.025-(0.5*c)}$, with $-0.005 \leq c \leq 0.005$.

11. A process of preparing a particulate precursor compound for manufacturing an aluminum doped lithium transition metal (M)-oxide powder usable as an active positive electrode material in lithium-ion batteries, comprising the steps of:
   providing for a first quantity of alumina powder having a volume V1;
   providing for a first quantity of transition metal (M)-hydroxide or (M-oxyhydroxide powder as a core material, having a volume V2;
   mixing the first quantity of alumina powder with the first quantity of transition metal (M)-hydroxide or (M)-oxyhydroxide in a first dry-coating procedure, wherein V1+V2=V; and
   continue mixing until the volume V decreases to V3 that has about the same value as V1, thereby covering a transition metal (M)-hydroxide or (M)-oxyhydroxide core with an non-amorphous aluminum oxide $Al_2O_3$ coating layer.

12. The process of clause 11, further including the steps of:
   providing for a second quantity of alumina powder having a volume V4;
   mixing the second quantity of alumina powder with the mixture having the volume V3 in a second dry-coating procedure; and
   increasing the alumina level of the coating layer.

13. The process of clause 11, wherein the mixing step is continued until the volume V decreases to a constant volume V3, thereby covering a transition metal (M)-hydroxide or (M)-oxyhydroxide core with an non-amorphous aluminum oxide $Al_2O_3$ coating layer.

14. The process of clause 11, wherein the mixing step is continued until no visible traces of alumina powder remain.

15. The process of clause 11, further including the step of covering the transition metal (M)-hydroxide or (M)-oxyhydroxide core entirely with the aluminum oxide $Al_2O_3$ coating layer, wherein the coating layer has a crystalline structure.

16. The process of clause 11, further including the step of characterizing the precursor compound as having a general formula $(M\text{-hydroxide})_a \cdot (Al_2O_3)_b$ or $(M\text{-oxyhydroxide})_a \cdot (Al_2O_3)_b$, wherein $a+F(2*b)=1$.

17. The process of clause 11, further including the steps of:

mixing the particulate precursor with the alumina powder in a Henschel type mixer; and rotating the mixer at a constant speed of about 1000 rpm for about 30 minutes.

18. The process of clause 11, further including the step of obtaining the transition metal (M)-hydroxide or (M)-oxyhydroxide by coprecipitation of the sulfates of the elements constituting the transition metal M in the presence of an alkali hydroxide and a chelating agent, such as ammonia.

19. The process of clause 11, wherein the alumina powder is a nanometric fumed alumina powder.

20. A process of preparing a particulate precursor compound for manufacturing an aluminum doped lithium transition metal (M)-oxide powder usable as an active positive electrode material in lithium-ion batteries, comprising the steps of: preparing a particulate precursor compound using the process of clause 11, and subsequently mixing the precursor compound with a lithium precursor compound such as lithium carbonate and lithium hydroxide; and heating the mixture at a temperature between 750° C. and 1200° C. in a flow of air.

The invention claimed is:

1. A particulate precursor compound for manufacturing an aluminum doped lithium transition metal (M)-oxide powder usable as an active positive electrode material in lithium-ion batteries, the precursor compound comprising particles, each particle comprising:

a transition metal (M)-hydroxide or (M)-oxyhydroxide core; and a non-amorphous aluminum oxide $Al_2O_3$ coating layer covering the core, wherein the cores of the particles have a size distribution, and wherein each particle has an aluminum concentration that is inversely correlated with the size of its core.

2. The particulate precursor compound of claim 1, wherein the precursor compound has a general formula (M-hydroxide)$_a$·($Al_2O_3$)$_b$ or (M-oxyhydroxide)$_a$·($Al_2O_3$)$_b$, wherein $a+(2*b)=1$.

3. The particulate precursor compound of claim 2, wherein $b \leq 0.4$.

4. The particulate precursor compound of claim 1, wherein the transition metal (M) is $Ni_xMn_yCo_z$, and wherein $0.3 \leq x \leq 0.9$; $0 \leq y \leq 0.45$ and $0 < z \leq 0.4$ with $x+y+z=1$.

5. The particulate precursor compound of claim 1, wherein the coating layer contains crystalline alumina nanoparticles.

6. The particulate precursor compound of claim 1, wherein the coating layer covers an entire outer surface of the core.

7. The particulate precursor compound of claim 1, comprising an aluminum doping level of 3 mol % or higher.

8. The particulate precursor compound of claim 1, wherein the transition metal (M)-hydroxide or (M)-oxyhydroxide core is mixed with nanometric non-agglomerated alumina powder in one or more procedures to dry-coat the core with the coating layer.

9. The particulate precursor compound of claim 2, having the composition $[Ni_{0.821}Co_{0.154}(OH)_2]_{0.975+c} \cdot [Al_2O_3]_{0.025-(0.5*c)}$, with $-0.005 \leq c \leq 0.005$.

* * * * *